(12) United States Patent
Mekhilef et al.

(10) Patent No.: US 10,266,722 B2
(45) Date of Patent: Apr. 23, 2019

(54) COMPOSITE BEARINGS HAVING A POLYIMIDE MATRIX

(71) Applicant: SAINT-GOBAIN PERFORMANCE PLASTICS CORPORATION, Solon, OH (US)

(72) Inventors: Nafih Mekhilef, Shrewsbury, MA (US); Boguslawa Czarnecka, Northborough, MA (US); Jeffrey H. Peet, Southborough, MA (US); Emeric Malefant, Paris (FR); Blair K. Brettmann, Chicago, IL (US); Hongxiang Teng, Westboro, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/850,121

(22) Filed: Dec. 21, 2017

(65) Prior Publication Data

US 2018/0134917 A1    May 17, 2018

Related U.S. Application Data

(62) Division of application No. 14/586,569, filed on Dec. 30, 2014, now Pat. No. 9,890,298.

(Continued)

(51) Int. Cl.
*C09D 179/08* (2006.01)
*C09D 127/18* (2006.01)
(Continued)

(52) U.S. Cl.
CPC ........ *C09D 179/08* (2013.01); *C08G 73/105* (2013.01); *C08G 73/1071* (2013.01);
(Continued)

(58) Field of Classification Search
CPC .. C08G 73/107; C08G 73/105; C09D 179/08; C09D 127/18; F16C 33/208;
(Continued)

(56) References Cited

U.S. PATENT DOCUMENTS 3,781,205 A   12/1973  Cairns et al.
4,014,834 A   3/1977   Concannon
(Continued)

FOREIGN PATENT DOCUMENTS

CN    1215741 A     5/1999
CN    103270327 A   8/2013
(Continued)

OTHER PUBLICATIONS

International Search Report issued for PCT/US2014/072828, dated Apr. 1, 2015, 1 page.

*Primary Examiner* — William K Cheung
(74) *Attorney, Agent, or Firm* — Abel Law Group, LLP; Chi Suk Kim

(57) ABSTRACT

The present disclosure relates to bearing and seal assemblies comprising a composite structure which includes a substrate and a layer disposed on the substrate. The layer disposed on the substrate includes a polyimide matrix and a filler dispersed within the polyimide matrix. The filler can be a thermoplastic polymer, such as PTFE, and/or an organic filler. The bearing assembly can exhibit a synergistic improvement in wear resistance and coefficient of friction.

19 Claims, 13 Drawing Sheets

Related U.S. Application Data

(60) Provisional application No. 61/922,421, filed on Dec. 31, 2013.

(51) Int. Cl.
*F16C 33/20* (2006.01)
*C08G 73/10* (2006.01)

(52) U.S. Cl.
CPC .......... *C09D 127/18* (2013.01); *F16C 33/201* (2013.01); *F16C 33/208* (2013.01); *F16C 2208/40* (2013.01); *Y10T 428/31681* (2015.04)

(58) Field of Classification Search
CPC .... F16C 33/201; F16C 2208/40; C08L 79/08; C08L 27/18; Y10T 428/31681
USPC ........................................................ 524/514
See application file for complete search history.

(56) References Cited

U.S. PATENT DOCUMENTS

| | | | |
|---|---|---|---|
| 5,880,205 A | 3/1999 | Tannenbaum | |
| 5,900,197 A | 5/1999 | Matsui et al. | |
| 5,971,617 A | 10/1999 | Woelki et al. | |
| 7,887,922 B2 | 2/2011 | Mayston et al. | |
| 8,840,308 B2 | 9/2014 | Ortiz et al. | |
| 9,303,230 B2 | 4/2016 | Tomikawa et al. | |
| 9,890,298 B2 | 2/2018 | Mekhilef et al. | |
| 2005/0164002 A1 | 7/2005 | Krizan et al. | |
| 2010/0228002 A1 | 9/2010 | Sohn et al. | |
| 2011/0317955 A1* | 12/2011 | Mayston | C08L 79/08 384/625 |
| 2012/0128280 A1 | 5/2012 | Ortiz et al. | |
| 2012/0251021 A1 | 10/2012 | Swei | |
| 2012/0275731 A1 | 11/2012 | Ziegler et al. | |
| 2013/0183488 A1 | 7/2013 | Liao et al. | |
| 2015/0184694 A1 | 7/2015 | Mekhilef et al. | |

FOREIGN PATENT DOCUMENTS

| | | |
|---|---|---|
| EP | 0385302 A1 | 9/1990 |
| EP | 0299785 B1 | 2/1991 |
| EP | 1331412 B1 | 9/2007 |
| EP | 2402606 A1 | 1/2012 |
| JP | S5421498 B1 | 7/1979 |
| JP | S57102722 U | 6/1986 |
| JP | H04189827 A | 7/1992 |
| JP | 2000136397 A | 5/2000 |
| TW | 384363 B | 3/2000 |
| WO | 2003095574 A1 | 11/2003 |
| WO | 2012068530 A2 | 5/2012 |
| WO | 2013101928 A1 | 7/2013 |
| WO | 2013039177 A1 | 3/2015 |
| WO | 2015103306 A1 | 7/2015 |

* cited by examiner

COMPOSITE BEARINGS HAVING A POLYIMIDE MATRIX

CROSS-REFERENCE TO RELATED APPLICATION(S)

This application is a divisional and claims priority under 35 U.S.C. § 120 to U.S. patent application Ser. No. 14/586,569 entitled "COMPOSITE BEARINGS HAVING A POLYIMIDE MATRIX," by Nafih Mekhilef et al., filed Dec. 30, 2014 now U.S. Pat. No. 9,890,298, which application claims priority under 35 U.S.C. § 119(e) to U.S. Provisional Application No. 61/922,421 entitled "POLYIMIDE PTFE IN-SITU COMPOSITE FOR BEARINGS APPLICATIONS," by Nafih Mekhilef et al., filed Dec. 31, 2013, of which all are assigned to the current assignee hereof and incorporated herein by reference in their entireties.

FIELD OF THE DISCLOSURE

The present disclosure relates to composites, and more particularly to, composites used to construct bearings and seals.

RELATED ART

Bearing and seal assemblies are widely used in the industry as in interface between a movable surface and a stationary surface. Traditionally, it is desired to increase the wear resistance of the bearing assembly while also having a desirably low coefficient of friction. However, most attempts to improve the wear resistance negatively affect the coefficient of friction and vice versa. Accordingly, a need exist to develop novel bearing and seal assemblies in which the composite exhibits both an improved wear resistance and improved coefficient of friction.

Moreover, the method of producing composite bearings, and particularly composite bearings incorporating a polyimide matrix have drawbacks. In particular, an in-situ or continuous method of forming the polyimide matrix is desired. Such in-situ imidization and formation of polyimide matrixes with dispersed fillers or thermoplastics in composites, bearings and seals has not been disclosed or suggested.

The present disclosure provides a composite assembly satisfying these and other needs as will be illustrated in detail below.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the composites, bearings and seals arts.

Figure 1:
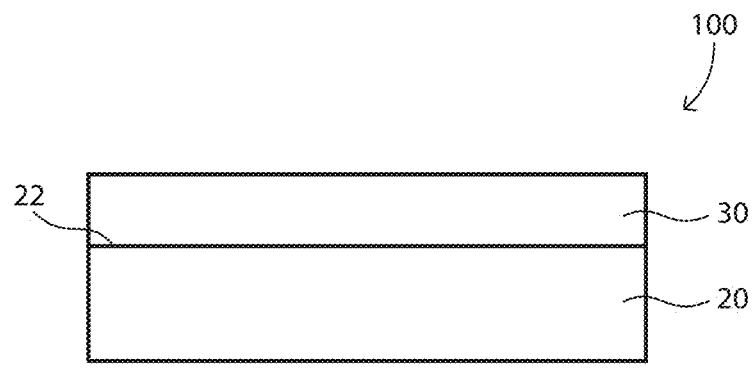
FIG. 1 includes an illustration of a composite according to an embodiment of the disclosure.

The following disclosure describes composites, and particularly composite bearings having a polyimide matrix filled with materials, such as a thermoplastic, dispersed within the polyimide matrix. Also described is a method of forming a composite, wherein a mixture containing a polyimide precursor or imide monomers is deposited on a substrate and imidized on the substrate. Such in-situ imidization and formation of polyimide matrixes with dispersed fillers or thermoplastics in composites, bearings and seals has not been disclosed or suggested. The concepts are better understood in view of the embodiments described below that illustrate and do not limit the scope of the present invention FIG. 1 illustrates a composite 100 containing a substrate 20 and a first layer 30 disposed on the substrate 20. As illustrated, the first layer 30 may be disposed directly adjacent the substrate 20 such that the first layer 30 is directly contacting the substrate 20. However, as discussed in more detail below, the composite may include intermediate layer(s) disposed between the substrate and first layer 30.

The substrate 20 can be constructed out of any material capable of being formed into a bearing or seal. In certain embodiments, the substrate can contain a metal, such as steel, aluminum, bronze, copper, or combinations thereof.

The surface 22 of the substrate 20 adjacent to first layer 30 may be mechanically treated to improve adhesion between the substrate and first layer 30. For example, mechanically treating the surface 22 of the substrate 20 can include blasting or mechanically etching the surface 22 of the substrate 20. The surface 22 of the substrate 20 can be mechanically treated such that the surface 22 of the substrate 20 has an advantageous surface roughness.

Referring again to FIG. 1, adjacent the substrate 20 may be a first layer 30. The first layer 30 can be formed of a combination of materials. In particular embodiments, the first layer 30 can contain a polyimide matrix and a filler dispersed within the polyimide matrix.

As used herein, "polyimide matrix" refers to a crosslinked network of polyimide, where the polyimide is at least about 25 wt. % of the first layer, based on the total weight of the first layer 30.

As will be discussed in more detail below, the polyimide matrix can be formed from imidizing a polyimide precursor after deposition on a substrate. A suitable polyimide precursor can include, for example, poly(amic) acid (PAA). The poly(amic) acid (PAA) can be a reaction product of a monomer mixture containing at least two different monomers. In certain embodiments, the at least two different monomers can selected from the group consisting of: pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and 4, 4'-oxydianiline (ODA), or m-phenylene diamine (m-PDA), 4, 4'-diaminophenyl sulphone (4,4'-DDS), p-phenylene diamine (p-PDA), and methylene dianiline (MDA). As such, in particular embodiments, the polyimide matrix can be a crosslinked, reaction product of at least two different monomers listed above. In particular embodiments the polyimide matrix may be a pure polyimide matrix. As used herein, the phrase pure polyimide matrix is a polyimide matrix that is essentially free of copolymers with imide monomers. In other words, in certain embodiments, the polyimide matrix can be essentially free of non-imide monomers.

Further, in certain embodiments, the polyamic acid can be derived from a first monomer and a second monomer. The first monomer can be selected from the group consisting of pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and any combination thereof. The second monomer can be selected from the group consisting of 4, 4'-oxydianiline (ODA), or m-phenylene diamine (m-PDA), 4, 4'-diaminophenyl sulphone (4,4'-DDS), p-phenylene diamine (p-PDA), methylene dianiline (MDA), and any combination thereof.

In particular embodiments, the polyimide matrix can be derived from a polyamic acid salt. For example, polyamic acid can be dissolved in a solvent such as N-methylpyrolidone and reacted with, for example, a tertiary amine, to form a water soluble polyamic acid salt solution. The polyamic acid salt solution can then be blended with an aqueous dispersion of the filler, and because the polyamic acid salt solution is miscible in water, a more uniform dispersion of the filler within the polyimide matrix can be produced. After application to a substrate and curing, volatile materials present in the first layer, including the salt moiety of the polyamic acid salt as the imide bonds are formed during curing.

As discussed above, first layer 30 may also contain a filler dispersed within the polyimide matrix. Fillers can include, but are not limited to, carbon graphite, grapheme, carbon nanotubes, ekonol, glass fibers, a polymeric compound such as a thermoplastic, an organic compound, inorganic compound, or combinations thereof In particular embodiments, the filler can be a thermoplastic material. In certain embodiments, the thermoplastic can be a fluoropolymer, for example a perfluoropolymer. In even more particular embodiments, the thermoplastic can be PTFE, PVF, PVDF, PCTFE, PFA, FEP, ETFE, or combinations thereof. In very particular embodiments, the thermoplastic can include PTFE or even consist essentially of PTFE. Further, the thermoplastic, such as PTFE, can be a regrind thermoplastic.

In other particular embodiments, the filler can be an organic filler. For example, in certain embodiments, the organic filler can comprise an aromatic polyester, a recycled polyimide, polyamide ether imide, polyamide imide, PEEK, PEEK-like polymers of polyaryl family, liquid crystalline polymers (LCP), polybenzimidazole, or combinations thereof.

The filler can be present in the mixture in an amount of from greater than 0 wt. % to 80 wt. % by weight, based on the combined weight of the thermoplastic, polyimide precursor, and filler. For example, in particular embodiments, the filler can be present in the mixture in an amount of at least 1 wt. %, at least 3 wt. %, at least 5 wt. %, at least 7 wt. %, at least 8 wt. %, at least 10 wt. %, at least 12 wt. %, at least 14 wt. %, at least 16 wt. %, at least 18 wt. %, at least 20 wt. %, at least 22 wt. %, at least 24 wt. %, at least 26 wt. %, at least 28 wt. %, or even at least 30 wt. % based on the combined weight of the thermoplastic, polyimide precursor, and filler. Further, in particular embodiments, the filler can be present in the mixture in an amount of no greater than 80 wt. %, no greater than 78 wt. %, no greater than 76 wt. %, no greater than 74 wt. %, no greater than 72 wt. %, no greater than 70 wt. %, no greater than 68 wt. %, no greater than 66 wt. %, no greater than 64 wt. %, no greater than 62 wt. %, or even no greater than 60 wt. % based on the combined weight of the thermoplastic, polyimide precursor, and filler. Moreover, in particular embodiments, the filler can be present in the mixture in a range of any of the minimum and maximums provided above, such as in a range of 1 wt. % to 80 wt. %, or even 10 wt. % to 70 wt. % based on the combined weight of the thermoplastic, polyimide precursor, and filler.

It is to be understood the mixture can include any combination of the fillers provided above. In particular embodiments, the mixture can include a thermoplastic filler and an organic filler.

First layer 30 may also contain any desired additive. For example, some additives may include a thickener or stabilizer. For example, stabilizers may include surfactants such as perfluoroalkoxy compounds, viscosifiers. Thickeners can include, for example, algocel and glycols or combinations thereof. The additives may be added in any desired amount to induce their desired additive effect.

In particular embodiments, first layer 30 can have a thickness of no greater than about 1 mm, no greater than about 800 microns, no greater than about 500 microns, no greater than about 300 microns, no greater than about 250 microns, no greater than about 200 microns, or even no greater than about 175 microns. Further, in certain embodiments, first layer 30 can have a thickness of at least about 0.01 microns, at least about 1 micron, at least about 50 microns, or even at least about 100 microns. It is to be understood that first layer 30 can contain one layer or more than one layer. In particular embodiments, first layer 30 can contain more than one layer that is formed from multiple passes through a coating operation.

First layer 30 can have a certain porosity. For example, in certain embodiments, first layer 30 can have a porosity of at least about 0.01%, at least about 0.05%, or even at least about 0.1%.

Figure 2:
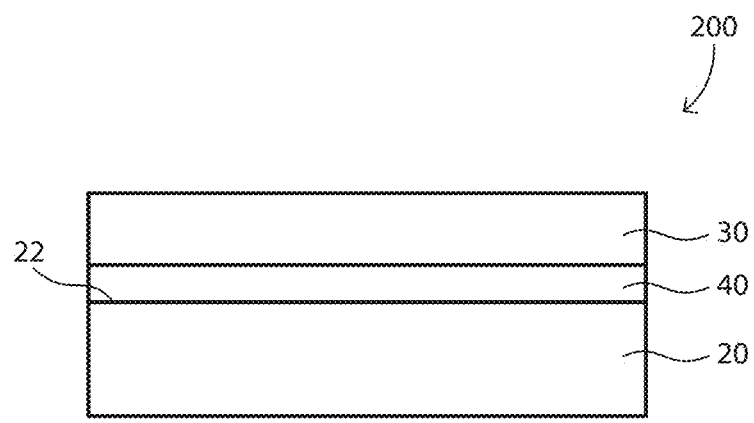
FIG. 2 includes an illustration of a composite according to another embodiment of the disclosure.

In certain embodiments, as particularly illustrated in FIG. 2, one or more additional intermediate layers 40 may be disposed between the substrate 20 and the first layer 30. An intermediate layer 40 may be provided to, for example, improve adhesion between the first layer 30 and the substrate 20. As can be appreciated by one of skill in the art, the particular choice of intermediate layer 40 will depend on the substrate 20 and composition of first layer 30. In particular embodiments, the intermediate layer 40 may contain zinc or a zinc containing compound. The additional intermediate layer may be provided as an alternative to or in addition to the mechanical treating of the surface 22 of the substrate 20 described above.

A particular advantage of the present disclosure is the achievement of certain performance properties such as average coefficient of friction, average wear resistance, and the ability to pass the Laminator Adhesion Test (Erichsen). It has heretofore not been known how to achieve the performance characteristics, and particularly combinations of performance characteristics described herein.

One characteristic that quantifies a bearing's performance can be its average coefficient of friction (COF). The average coefficient of friction (COF) is an industry standard term and can be measured according to ASTM G-77.

In certain embodiments, a bearing according to the disclosure herein can have an average coefficient of friction (COF) of no greater than about 1, no greater than about 0.8, no greater than about 0.7, no greater than about 0.6, no greater than about 0.5, no greater than about 0.4, no greater than about 0.3, no greater than about 0.25, no greater than about 0.2, no greater than about 0.18, no greater than about 0.15, or even no greater than about 0.12 as measured according to ASTM G-77. Further, in certain embodiments, a bearing according to the disclosure herein can have an average coefficient of friction (COF) of no less than about 0.001, no less than about 0.01, or even no less than about 0.05 as measured according to ASTM G-77. Moreover, in particular embodiments, a bearing according to the disclosure herein can have an average coefficient of friction within a range of any of the minimum and maximums provided above, such as in a range of 0.001 to 1, or even from 0.01 to 0.7.

Another characteristic that can quantify a bearing's performance is its average wear resistance. The wear resistance is a measurement of the amount of material that is removed from the bearing during a wear test conducted according to ASTM G-77.

In certain embodiments, a bearing according to the disclosure herein can have an average wear resistance of no greater than about 10 mm$^3$, no greater than about 8 mm$^3$, no greater than 5 mm$^3$, no greater than about 4 mm$^3$, no greater than about 3 mm$^3$, no greater than about 2.9 mm$^3$, no greater than about 2 mm$^3$, no greater than about 1.5 mm$^3$, no greater than about 1.3 mm$^3$, no greater than about 1.1 mm$^3$, no greater than about 1 mm$^3$, no greater than about 0.8 mm$^3$, no greater than about 0.6 mm$^3$, no greater than about 0.5 mm$^3$, no greater than about 0.3 mm$^3$, or even no greater than about 0.2 mm$^3$ as measured according to ASTM G-77. Further, in certain embodiments, a bearing according to the disclosure herein can have an average wear resistance of no less than about 0.001 mm$^3$, no less than about 0.01 mm$^3$, or even no less than about 0.05 mm$^3$ as measured according to ASTM G-77. Moreover, in particular embodiments, a bearing according to the disclosure herein can have an average wear resistance in a range of any of the minimum and maximum values provided above, such as in a range of 0.001 mm$^3$ to 10 mm$^3$, or even from 0.01 mm$^3$ to 4 mm$^3$.

A third characteristic which can quantify a bearing's performance is the ability of the bearing to pass the Laminator Adhesion Test (Erichsen). The Laminator Adhesion Test is a measure of the adherence of the first layer to the second layer in the bearing assembly and is well known in the art.

In certain embodiments, a bearing according to the disclosure herein can pass the Laminator Adhesion Test (Erichsen).

According to another aspect of the disclosure, methods for forming a composite sheet and forming a composite bearing are described. In one embodiment, the method can include: providing a polyimide precursor or imide monomers; providing a filler; providing a solvent; blending the filler, a solvent, and the polyimide precursor or imide monomers to form a mixture; depositing the mixture on a substrate; and thermally curing the substrate and deposited mixture. To form a composite bearing, the method may further include forming a composite bearing from the composite sheet.

In certain embodiments, the formation of the composite may be a continuous process. For example, the imidaztion can be performed in-situ such that the mixture with a polyimide precursor or monomers and filler can be mixed and applied to the substrate, and then imidized in-situ after depositing on the substrate.

The method may form a bearing having a coefficient of friction and a wear resistance as described above. For example, in particular embodiments, the method may form a bearing having a coefficient of friction of less than about 1, and a wear resistance of less than 2.9 mm$^3$.

The polyimide precursor can contain uncrosslinked polyimide or imide monomers. For example, the polyimide precursor can contain a poly(amic) acid. The poly(amic) acid can be derived from the reaction of at least two different monomers. In particular embodiments, the at least two different monomers selected from the group consisting of: pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and 4, 4'-oxydianiline (ODA), or m-phenylene diamine (m-PDA), 4, 4'-diaminophenyl sulphone (4,4'-DDS), p-phenylene diamine (p-PDA), and methylene dianiline (MDA).

In even further particular embodiments, the first monomer can contain a monomer selected from the group consisting of pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and any combination thereof; and the second monomer can contain a monomer selected from the group consisting of 4, 4'-oxydianiline (ODA), or m-phenylene diamine (m-PDA), 4, 4'-diaminophenyl sulphone (4,4'-DDS), p-phenylene diamine (p-PDA), methylene dianiline (MDA), and any combination thereof.

In particular embodiments, the poly(amic) acid can be in the form of a salt as described in detail above. Accordingly, in particular embodiments, the method can include providing, or even forming, a poly(amic) acid salt. For example, in certain embodiments, polyamic acid can be combined in a solvent and reacted with, for example, a tertiary amine to form a water soluble polyamic acid salt mixture. An aqueous dispersion containing the filler can then be added to the polyamic acid salt mixture and since the polyamic acid salt mixture is water soluble, the filler can be evenly dispersed throughout the polyamic acid salt and maintain their even dispersion after imidization during curing.

In particular embodiments, the polyimide precursor can be present in the mixture in an amount of from 20 to 99% by weight, based on the combined weight of the thermoplastic and the polyimide precursor. For example, in certain embodiments, the polyimide precursor can be present in the mixture in an amount of at least 20 wt. %, at least 22 wt. %, at least 24 wt. %, at least 26 wt. %, at least 28 wt. %, at least 30 wt. %, at least 32 wt. %, at least 34 wt. %, at least 36 wt. %, at least 38 wt. %, at least 40 wt. %, based on the combined weight of the thermoplastic and the polyimide precursor. Further, in certain embodiments, the polyimide precursor can be present in the mixture in an amount of no greater than 99 wt. %, no greater than 97 wt. %, no greater than 95 wt. %, no greater than 93 wt. %, no greater than 91 wt. %, no greater than 99 wt. %, no greater than 99 wt. %, no greater than 99 wt. %, no greater than 99 wt. %, no greater than 99 wt. %, based on the combined weight of the filler and the polyimide precursor.

As discussed above, the method can include providing a filler and incorporating the filler into the mixture and held within the polyimide matrix upon imidization and curing.

As discussed above, the filler can be a number of different materials, and in particular embodiments can include a thermoplastic, an organic filler, others, or combinations thereof. In certain embodiments, when a combination of fillers is used, such as a thermoplastic and/or organic fillers, the fillers can be combined together before being combined with the other components.

In particular embodiments, before being mixed into the solvent, the filler can be in particulate form. In such embodiments, the filler, and particularly a thermoplastic filler, and even more particularly PTFE, can have an average particle size ($D_{50}$) of at least about 1 micron, at least about 3 microns, at least about 5 microns, at least about 10 microns, at least about 15 microns, or even at least about 20 microns. Moreover, in certain embodiments, the filler can have an average particle size ($D_{50}$) of no greater than about 1000 microns, no greater than about 500 microns, no greater than about 50 microns, no greater than about 30 microns, no greater than about 20 microns, or even no greater than about 10 microns. Furthermore, the filler can have an average particle size ($D_{50}$) in a range between any of the maximum and minimum values described herein, such as in a range of from about 1 micron to 50 microns, from about 3 microns to about 30 microns, or even from about 5 microns to about 20 microns.

Further, the filler, before being combined with the polyimide precursor or imide monomers can be, for example, in a powdered form, or in other embodiments, in a dispersed phase in a solvent, such as water. In further embodiments, the mixture can be formed with both powdered filler and filler dispersed in a solvent.

In certain embodiments, the filler, such as a thermoplastic filler, can be present in the mixture in an amount of from greater than 0 to 80% by weight, based on the combined weight of the filler and the polyimide precursor. For example, in particular embodiments, the filler can be present in the mixture in an amount of at least 1 wt. %, at least 3 wt. %, at least 5 wt. %, at least 7 wt. %, at least 8 wt. %, at least 10 wt. %, at least 12 wt. %, at least 14 wt. %, at least 16 wt. %, at least 18 wt. %, at least 20 wt. %, at least 22 wt. %, at least 24 wt. %, at least 26 wt. %, at least 28 wt. %, or even at least 30 wt. % based on the combined weight of the filler and the polyimide precursor. Further, in particular embodiments, the filler can be present in the mixture in an amount of no greater than 80 wt. %, no greater than 78 wt. %, no greater than 76 wt. %, no greater than 74 wt. %, no greater than 72 wt. %, no greater than 70 wt. %, no greater than 68 wt. %, no greater than 66 wt. %, no greater than 64 wt. %, no greater than 62 wt. %, or even no greater than 60 wt. % based on the combined weight of the filler and the polyimide precursor. Moreover, in particular embodiments, the filler can be present in the mixture in a range of any of the minimum and maximums provided above, such as in a range of 1 wt. % to 80 wt. %, or even 10 wt. % to 70 wt. % based on the combined weight of the filler and the polyimide precursor.

In certain embodiments, a solvent can be provided with the filler, polyimide precursor or imide monomers, or can be added to the components individually or after combining the filler and polyimide precursor or imide monomers. In certain embodiments, the solvent can be mixed with the filler before mixing with the polyimide precursor or imide monomers. Further, a solvent can be added to the mixture. In particular embodiments, the solvent can include N-methyl-pyrrolidone (NMP), dimethylformamide, dimethylacetamide, diglyme, dimethylsulfoxide, xylene, or any combination thereof.

In particular embodiments, the solvent can include an aqueous component. In very particular embodiments, the solvent can include, at least, water and NMP.

As discussed above, the method may include blending the polyimide precursor or imide monomers, filler and optional solvent to form a mixture.

In certain embodiments, the components may be blended for a period of time of at least about 1 minute, at least about 5 minutes, or even at least about 15 minutes.

As discussed above, the method may include depositing the mixture on a substrate. The substrate can be any material discussed above, in particular, a metal such as steel, aluminum, bronze, copper, or combinations thereof.

The mixture may be deposited on the substrate by any suitable method. For example, in particular embodiments, the mixture can be deposited on the substrate by dip coating, spray coating, knife coating, or any other useful method. In particular embodiments, the mixture can be deposited on the substrate by dip coating. It is to be appreciated that first layer 30 can contain more than one layer, such as, being formed from multiple passes through the deposition operation. The mixture can be thermally cured between layers.

A particular advantage of certain embodiments of the present disclosure is the ability to form first layer 30 by a coating operation instead of, form example, skiving or extruding. Traditional sliding layers formed from coating operations have not been able to achieve the performance characteristics described herein. Moreover, by using a coating operation, the filler materials, such as thermoplastic material, can maintain their morphology unlike extrusion or skiving operations, which affect the filler morphology.

The mixture may be deposited such that the first layer 30 has a desired thickness. For example, the thickness of first layer 30 can be any thickness described above. Moreover, in certain embodiments, the method may further include adjusting the viscosity of the mixture to obtain a desired thickness of the mixture when coated on the substrate. For example, in some embodiments, the viscosity of the mixture may be adjusted as desired by varying the percentage of the components and/or addition of a viscosity modifying agent.

After deposition of the first layer, the method may include thermally curing the deposited mixture of polyimide precursor or imide monomers, thermoplastic, and solvent. Thermally curing results in the formation of polyimide (in the case of using imide monomers) and cross linking of the polyimide precursor while driving off the solvent. In certain embodiments, thermally curing can include a stepwise thermal curing process. For example, the step wise thermal curing can include a plurality of steps lasting between about 10 minutes and 6 hours, and wherein the steps have a temperature increase between successive steps of between about 10 degrees Celsius and 50 degrees Celsius. In particular embodiments, the temperature during any and/or all of the steps can be between about 80 degrees Celsius to no greater than about 450 degrees Celsius.

Thermal curing may be conducted such that a desired porosity of first layer 30 can be obtained. For example, thermal curing may be conducted such that the porosity of first layer 30 is at least about 0.1%.

In certain embodiments, the method may further include depositing an intermediate layer 90 between the substrate and the first layer 30. For example, an intermediate layer 90 may be provided to improve adhesion between the first layer 30 and the substrate. As can be appreciated by one of skill in the art, the particular choice of intermediate layer 90 will depend on the substrate and composition of first layer 30. In particular embodiments, the intermediate layer 90 may contain zinc or a zinc containing compound.

In certain embodiments, the method may include mechanically treating the surface of the substrate adjacent first layer 30, to improve adhesion between first layer 30 and the substrate. In such embodiments, the substrate can directly contact the first layer 30. Mechanically treating the surface of the substrate can include, for example, blasting or mechanically etching the surface of the substrate. In fact a particular advantage of certain embodiments of the present disclosure is an excellent adhesion between a substrate and the first layer as described herein, particularly metal substrates such as steel. For example, it was believed that adhesion would be difficult due to the difference in thermal expansion of the first layer and the substrate. However, without wishing to be bound by theory, the inventors were able to carefully control the curing conditions and produce a composite with an excellent adhesion between the substrate and the first layer from an in-situ, continuous, composite formation process.

In certain embodiments, the method may further include providing a catalyst and mixing the catalyst with the other components in the mixture. In particular embodiments, the catalyst can be first combined with the thermoplastic and that combination may be mixed with the other components of the mixture. The catalyst can accelerate the imidization of the polyamic acid.

In particular embodiments, the catalyst can include a strong tertiary aliphatic base, such as, for example, 1, 4-diazabicyclo[2.2.2]octane (DABCO); 1, 8-diazabicyclo [5.4.0]undec-7-ene (DBU); a nitrogen containing base; phenol; or an amphoteric material.

The method may further include providing and blending a desired additive into the mixture. For example, some additives may include a thickener or stabilizer.

Figure 18:
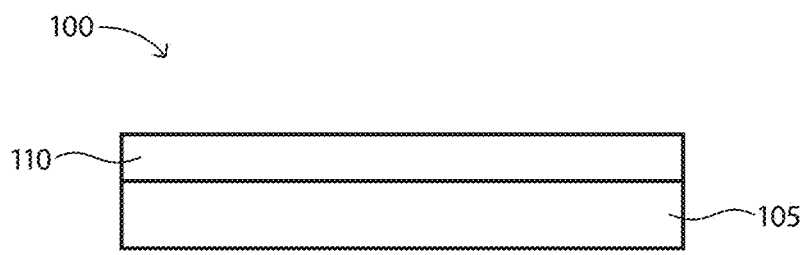
FIG. 18 illustrates a bearing pre-composite according to one embodiment.
Figure 19:
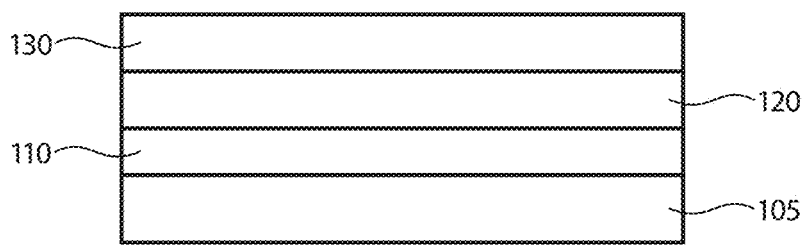
FIG. 19 illustrates a bearing pre-composite according to another embodiment.
Figure 20:
FIG. 20 illustrates the bearing pre-composite of FIG. 19 with the release layer removed according to one embodiment.

In certain embodiments, and referring in particular to FIG. 18, the polyimide layer can be formed and cured separately from the substrate, and then laminated to the substrate with, for example, a laminating adhesive. For example, as illustrated in FIG. 18, the composite precursor 100 can include a first substrate 105, such as a release layer, and the cured polyimide based layer 110 disposed adjacent the first substrate 105. Following, and referring to FIG. 19, the composite precursor 101 can include an adhesive layer 120 disposed adjacent the polyimide based layer 100, and then a second substrate 130, such as a metallic substrate, and more particularly a steel substrate, is disposed adjacent the adhesive layer 120. The release layer can then be removed from the composite such that the polyimide based layer 110 forms an outer major surface of the composite 100 as illustrated in FIG. 20.

In particular embodiments, the release layer can be a film, such as a Kapton film. The release layer can be treated, such as ionized with UV light.

The polyimide precursor solution can then be applied to the release layer by, for example, spray coating, dip coating, knife coating, roll coating, or combinations thereof.

The coated release layer can then be cured to imidize the polyimide precursor and filler mixture.

An adhesive layer can then be applied to the exposed polyimide layer, or to the substrate, and the cured coated release layer can be laminated to the substrate. The adhesive layer can include, for example, a modified ETFE film, and epoxy, or combinations thereof.

In particular embodiments, the adhesive layer can include a film, such as a modified ETFE film, and be adhered within the composite by, for example, lamination such as hot pressing.

A particular advantage of certain embodiments of the present disclosure is the formation of a composite that has an essentially crack free polyimide layer. For example, some processes for forming composite bearings deposit the uncured solution directly on the substrate and cure on the substrate. However, polyimide has a much different coefficient of thermal expansion that typical metallic substrates, which causes the polyimide layer to shrink and crack during curing when applied directly to and cured on a metallic substrate. In contrast, producing a composite material by forming and curing the polyimide on a release liner and then laminating to the metallic substrate has produced a composite that is essentially free of stress induced microcracks and does not delaminate.

To form a composite bearing from the composite sheet material, the sheet material can be at least partially cut and rolled to form a bearing having an inner layer (substrate) and an outer layer (first layer 30).

The present disclosure represents a departure from the state of the art. In particular, it has heretofore been unknown how to form a composite bearing which can provide the performance characteristics, and particularly the combination of performance characteristics described herein. For example, the present disclosure illustrates various bearings, seals, and the like having a crosslinked polyimide matrix with certain filler materials, such as a thermoplastic or organic filler, dispersed within the polyimide matrix. Such constructions as described in detail herein have unexpectedly been found to exhibit significantly superior coefficient of friction values and wear rates that were heretofore impossible to achieve.

These and other unexpected and superior characteristics are illustrated in the Examples below, which are exemplary and not limiting, in any way, to the embodiments described herein.

EXAMPLE 1

A two liter reactor equipped with a mechanical stirrer, a thermocouple, a Dean-Stark adapter, and a reflux condenser was charged with filler F4PN40 and xylene (425 g). The mixture was stirred at 60 degrees Celsius at 150 rpm to obtain a uniform dispersion of PTFE in the xylene solvent. Then, oxydianiline (ODA, 70 g, 0.350 mol) and N-methylpyrolidone (NMP, 433 g) were added. The solution mixture was stirred (150 rpm) and heated to 160 C under nitrogen gas to remove residual water as a xylene azeotrope using the Dean-Stark adapter. The mixture was cooled to 60 C and pyromellitic dianhydride (PMDA, 76.9 g, 0.353 mol) was added to the mixture under reaction conditions to a ratio of 1.0000:1.0085 ODA to PMDA. After addition, the reaction mixture was warmed to about 89 degrees Celsius, and became extremely viscous. The increase in temperature confirms the exothermic nature of poly(amic acid) formation. The reaction mixture was stirred and heated at 70 degrees Celsius for 2 hours, then the stirring was slowed down to 60 rpm and the solution was cooled down to room temperature. A 15% solution of poly(amic acid) was thus formed. The solution was stored in a clean and pre-dried glass bottle.

The solution of poly(amic acid) was heated to 60 degrees Celsius, and stirred at 12 rpm. The solution was then casted on an aluminum substrate. The coated substrate is the thermally cured at 70 degrees Celsius for 1 hour, 100 degrees Celsius for 1 hour, 120 degrees Celsius for 1 hour, 140 degrees Celsius for 1 hour, 160 degrees Celsius for about 30 minutes and at 250 degrees Celsius overnight in a vacuum oven under flow of nitrogen. Then composite sheet was cooled down gradually over about 6 hours and removed from the oven.

3 samples were prepared and tested for coefficient of friction and wear rate. Sample 1 was formed as described above with a 30 wt. % loading of PTFE and a coating thickness of about 175 microns. Sample 2 was formed the same as sample 1, except with a PTFE loading of 50 wt. % and a coating thickness of about 70 microns. Sample 3 was formed the same as sample 2, except with a coating thickness of about 285 microns. Comparative samples 4-6, which were obtained from Saint-Gobain Corporation were also supplied and tested.

Figure 3:
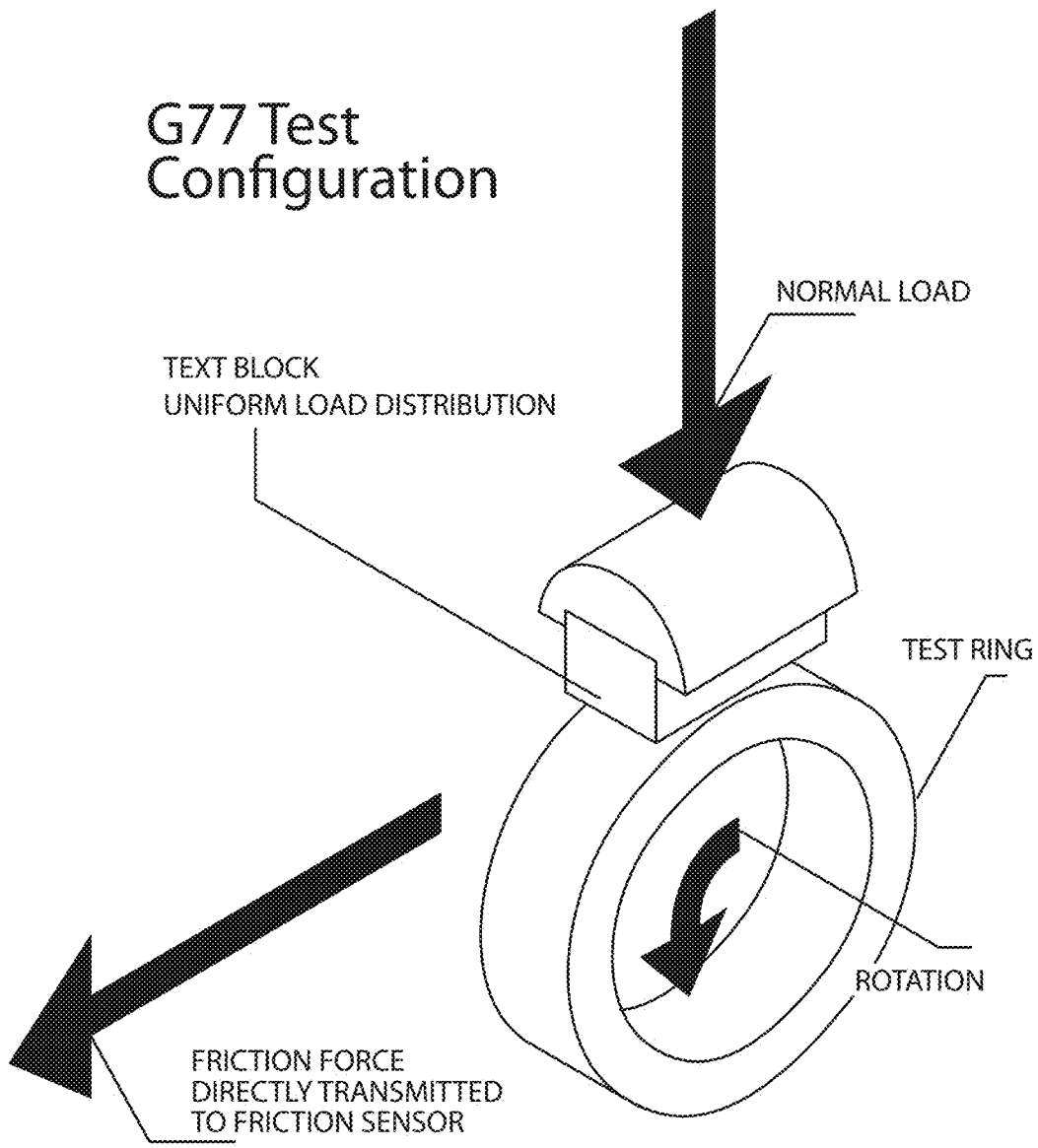
FIG. 3 includes an illustration of a testing assembly for wear rates and coefficient of frictions according to ASTM G-77.
Figure 4:
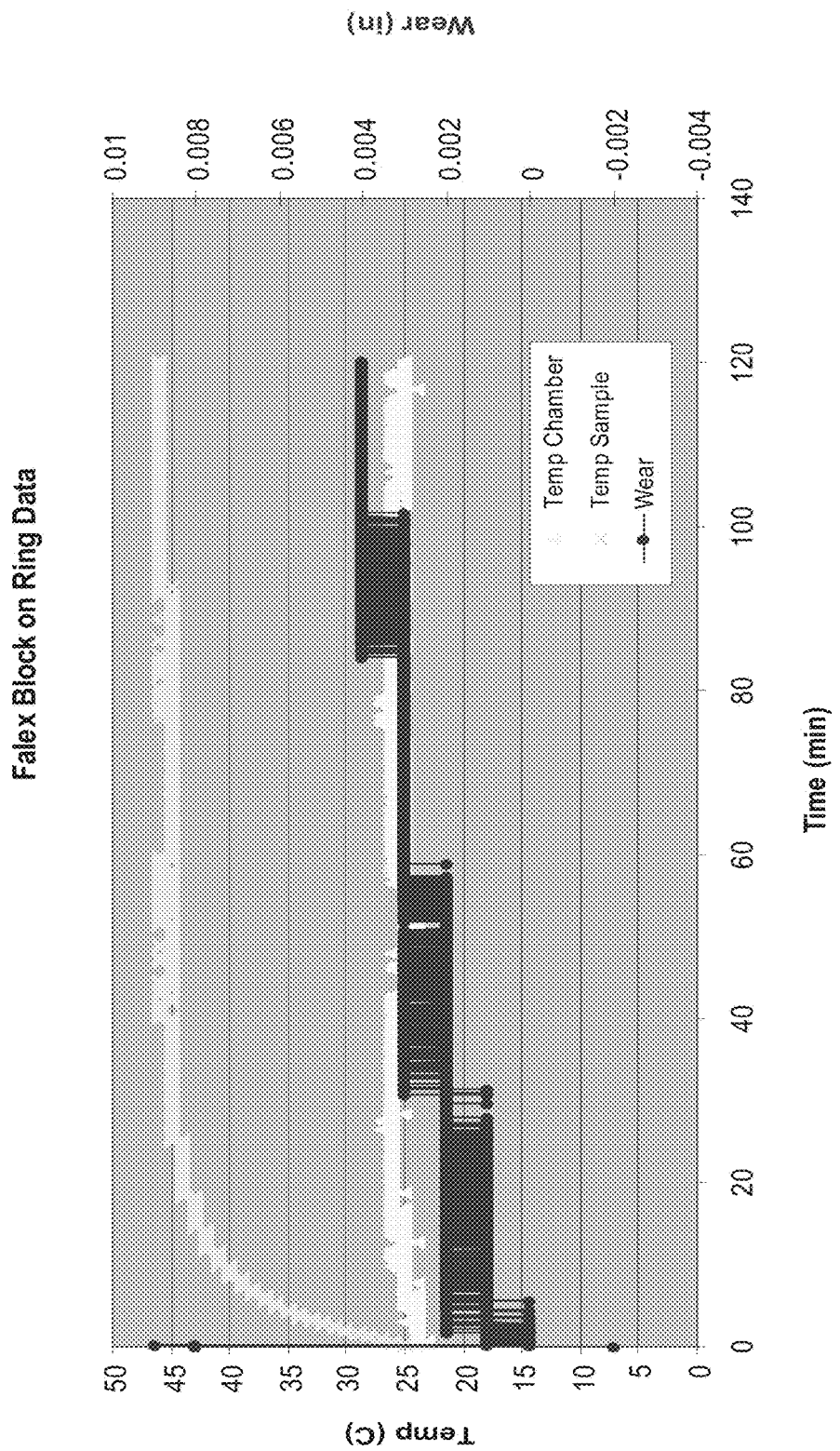
FIG. 4 illustrates a record of the wear and temperature as a function of time for Sample 1.
Figure 5:
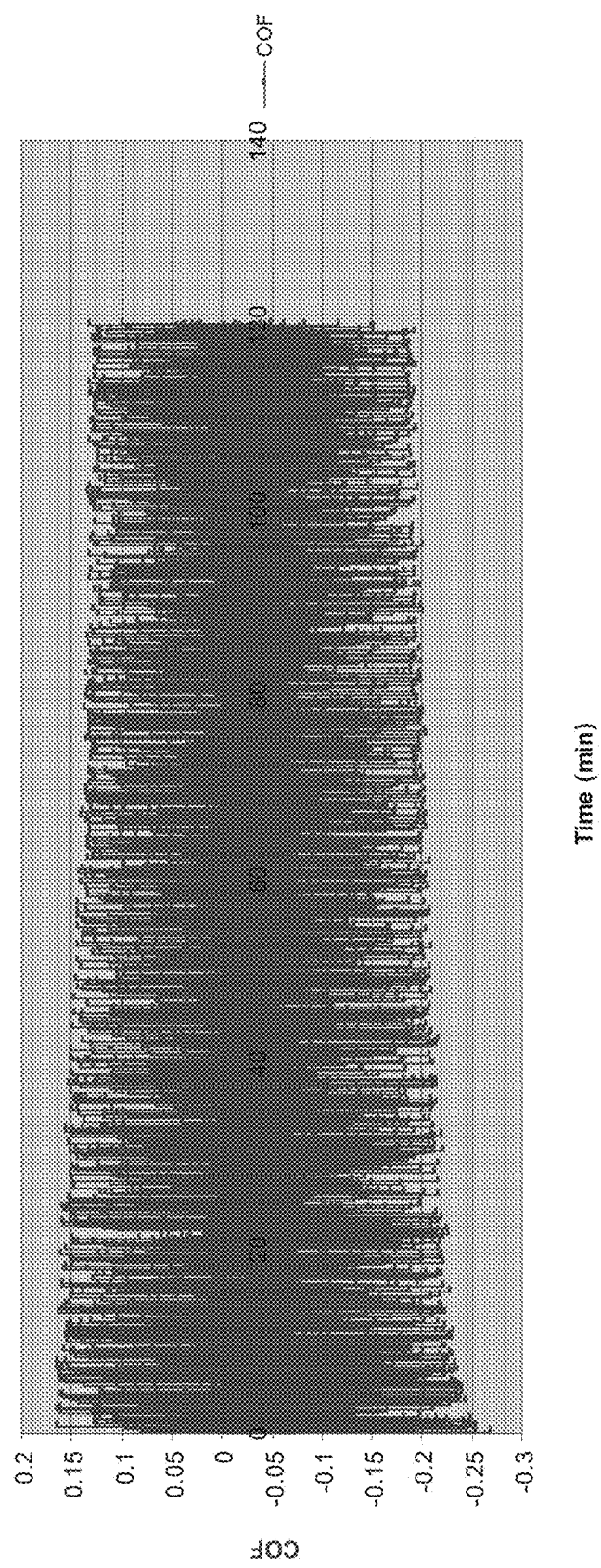
FIG. 5 illustrates a record of the coefficient of friction as a function of time for Sample 1.
Figure 6:
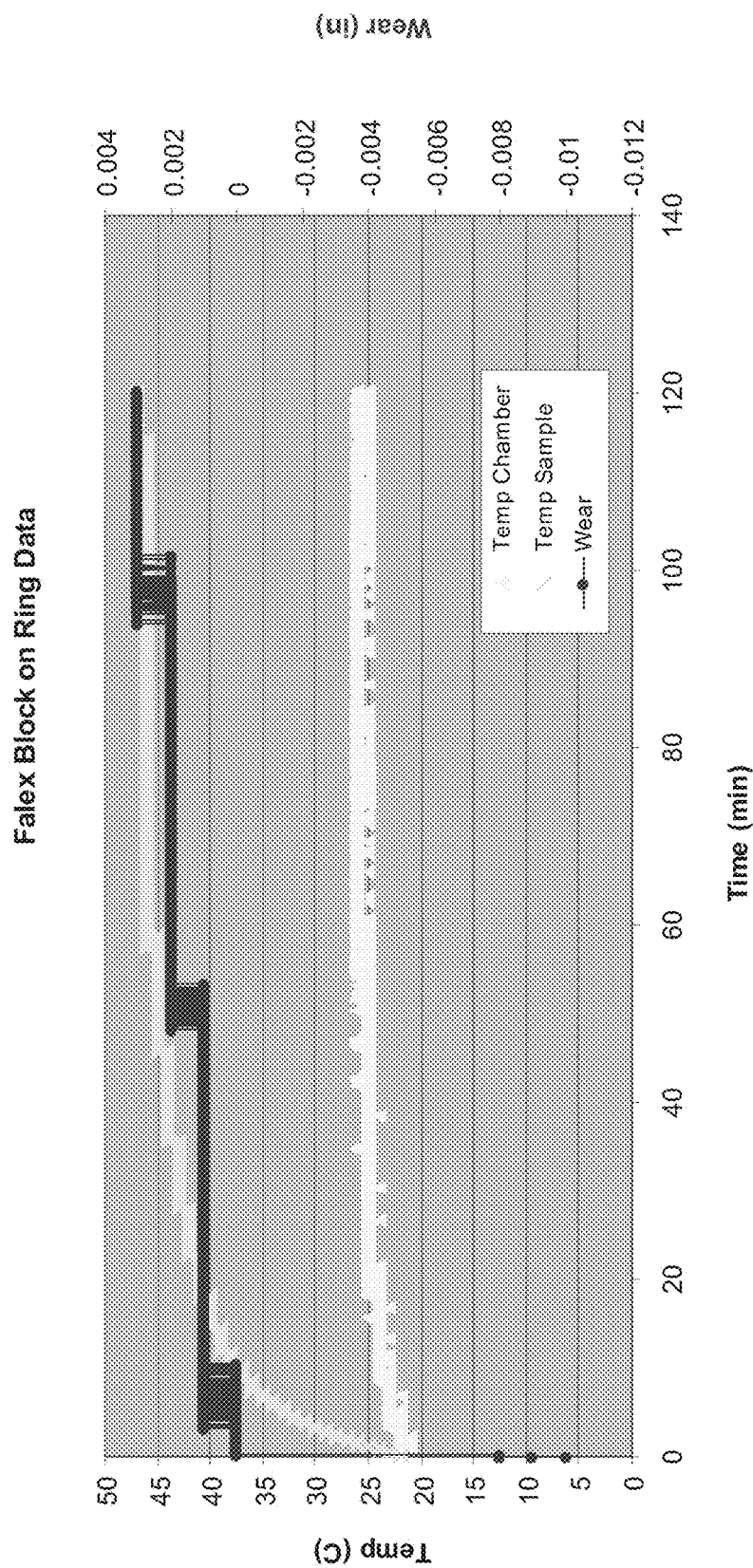
FIG. 6 illustrates a record of the wear and temperature as a function of time for Sample 2.
Figure 7:
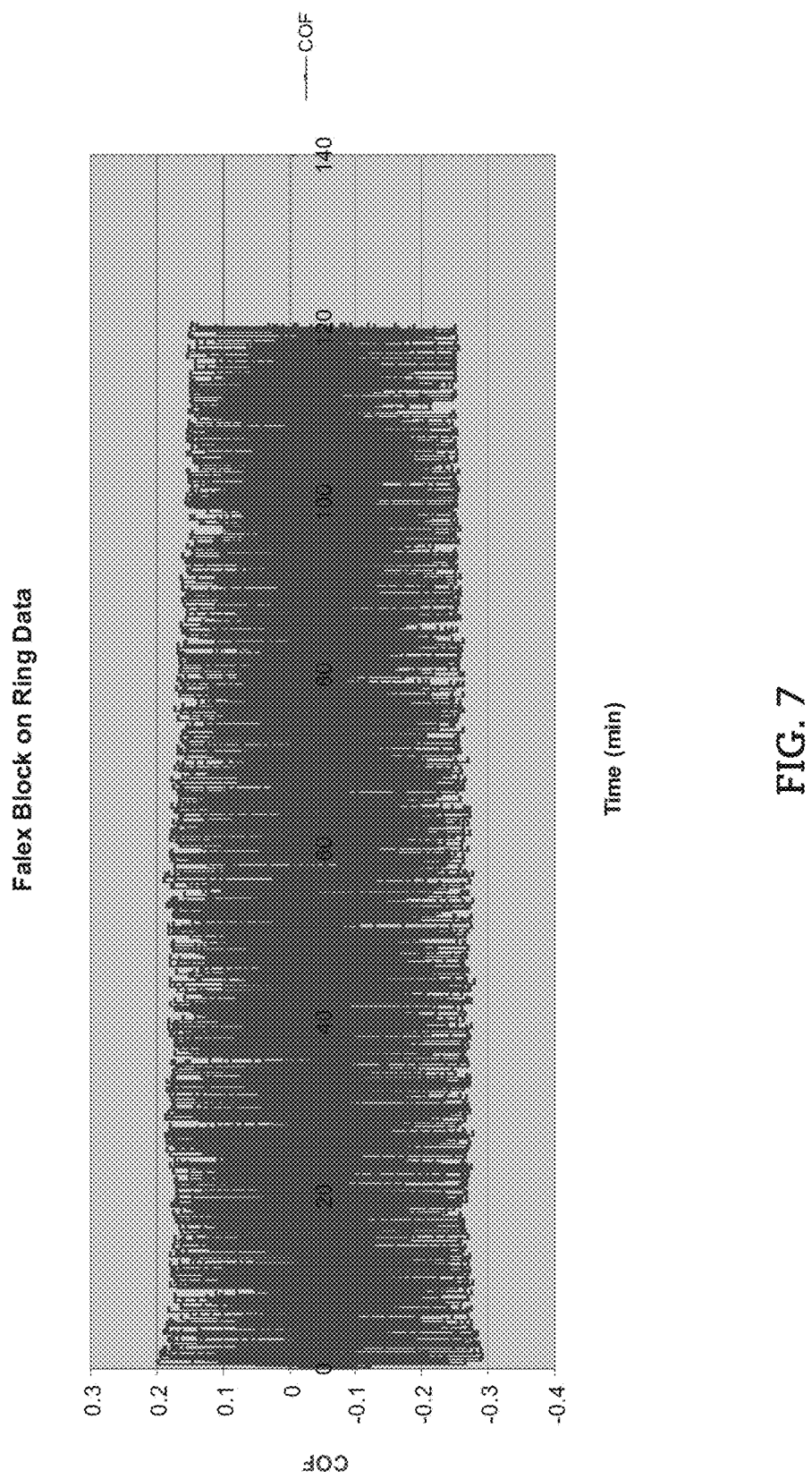
FIG. 7 illustrates a record of the coefficient of friction as a function of time for Sample 2.
Figure 8:
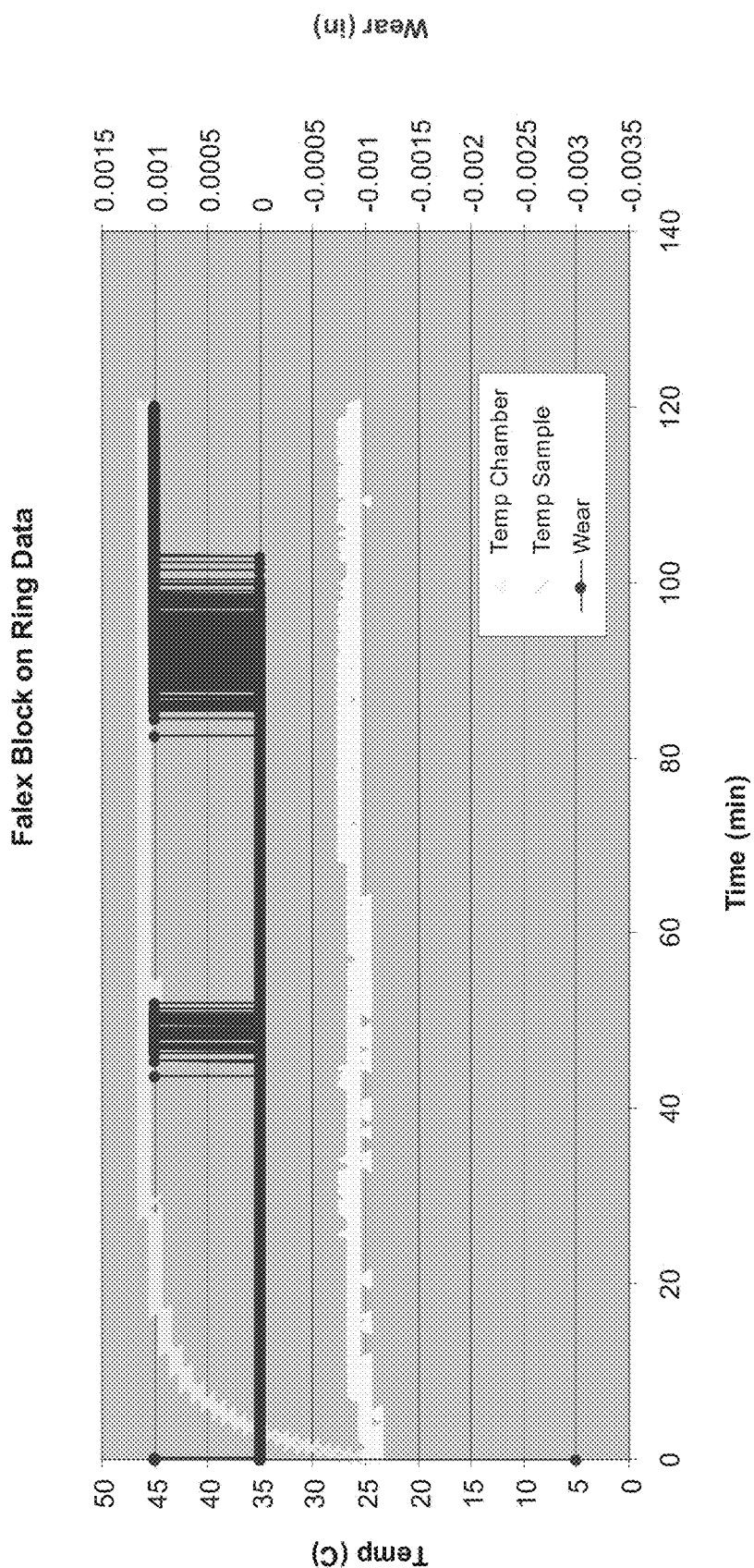
FIG. 8 illustrates a record of the wear and temperature as a function of time for Sample 3.
Figure 9:
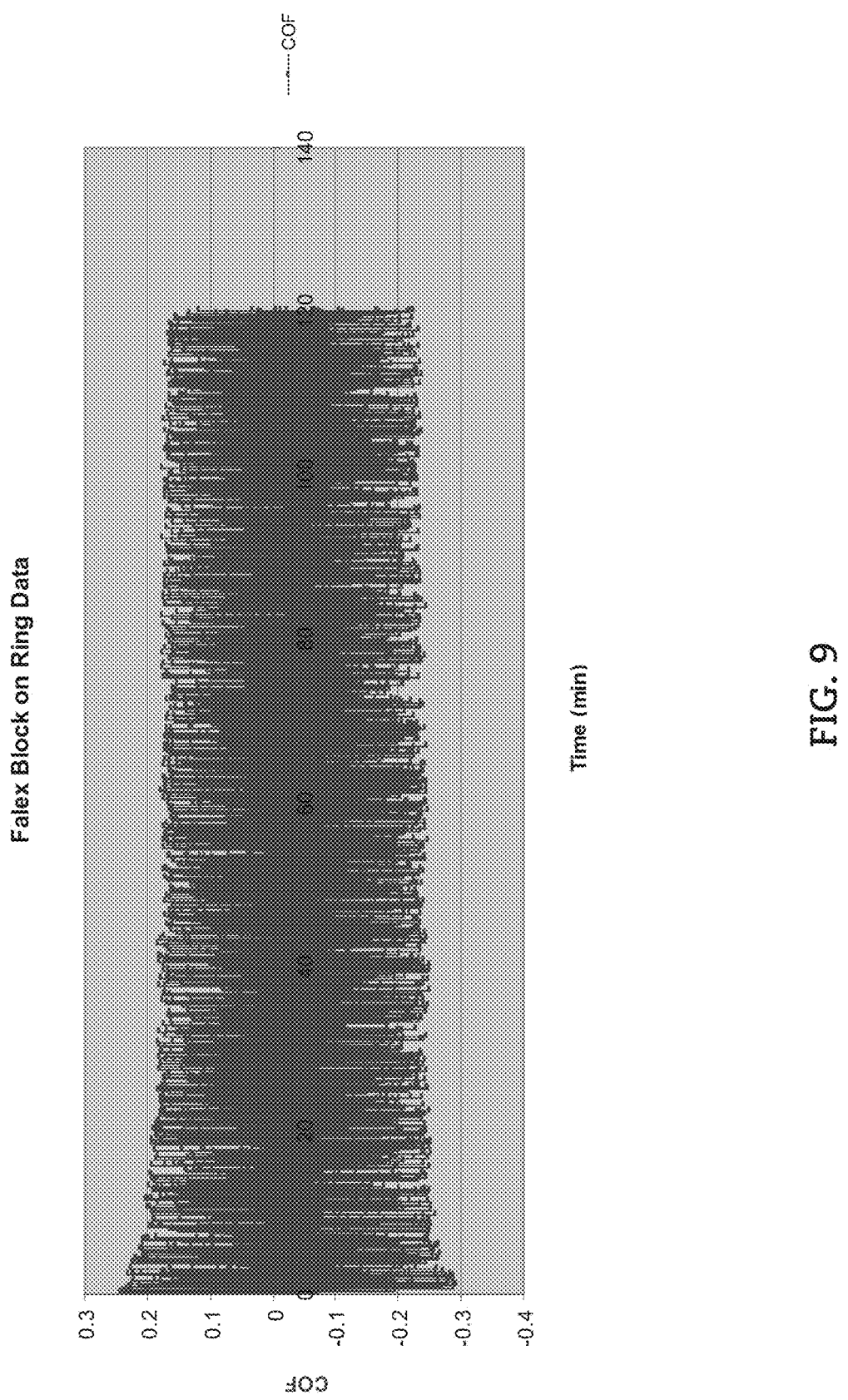
FIG. 9 illustrates a record of the coefficient of friction as a function of time for Sample 3.

Each sample was tested for coefficient of friction and wear rate according to ASTM G-77. A schematic illustration of the test configuration is illustrated in FIG. 3. During the test, block-on-ring geometry was used for determining sliding wear of the plastic materials. A stationary block specimen was pressed with a constant force against a rotating ring specimen at 90 degrees to the ring's axis of rotation. Friction between the sliding surfaces of the block and ring results in loss of material from both specimens. Wear is calculated using the volume loss of the block and weight loss of the ring. The temperature of each sample was also measured to illustrate the heat build-up during the test. The results of the test are provided below and in FIGS. 4-9. FIG. 4 illustrates a record of the wear and temperature as a function of time for Sample 1; and FIG. 5 illustrates a record of the coefficient of friction as a function of time for Sample 1. FIG. 6 illustrates a record of the wear and temperature as a function of time for Sample 2; and FIG. 7 illustrates a record of the coefficient of friction as a function of time for Sample 2. FIG. 8 illustrates a record of the wear and temperature as a function of time for Sample 3; and FIG. 9 illustrates a record of the coefficient of friction as a function of time for Sample 3.

Figure 10:
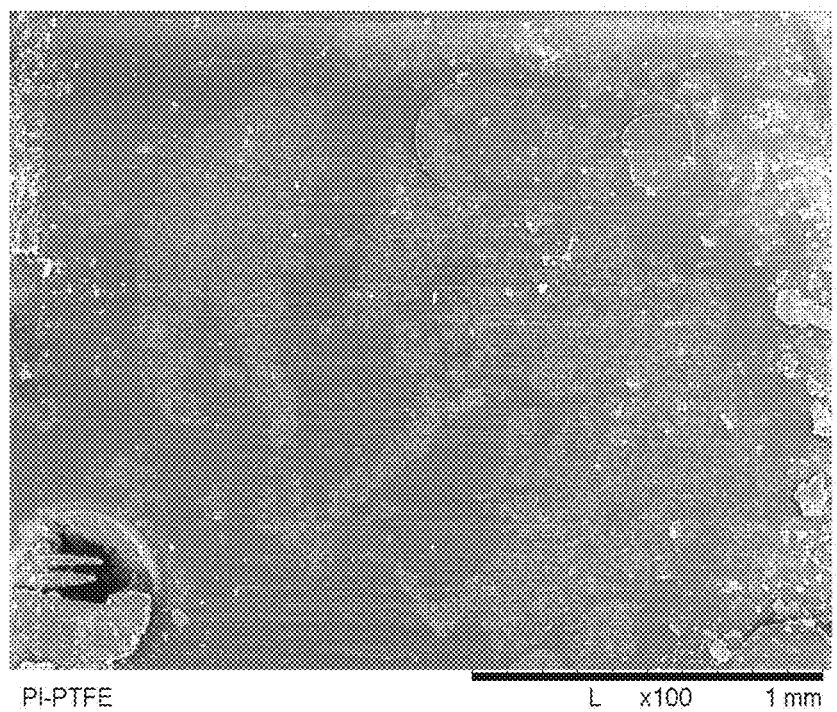
FIGS. 10 and 11 illustrate the SEM of Sample 1.
Figure 11:
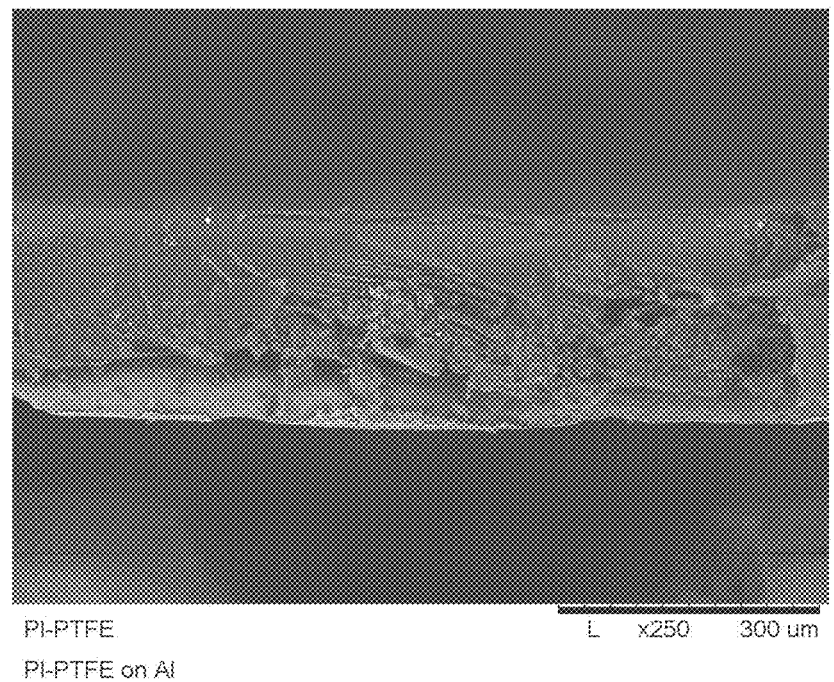
Figure 12:
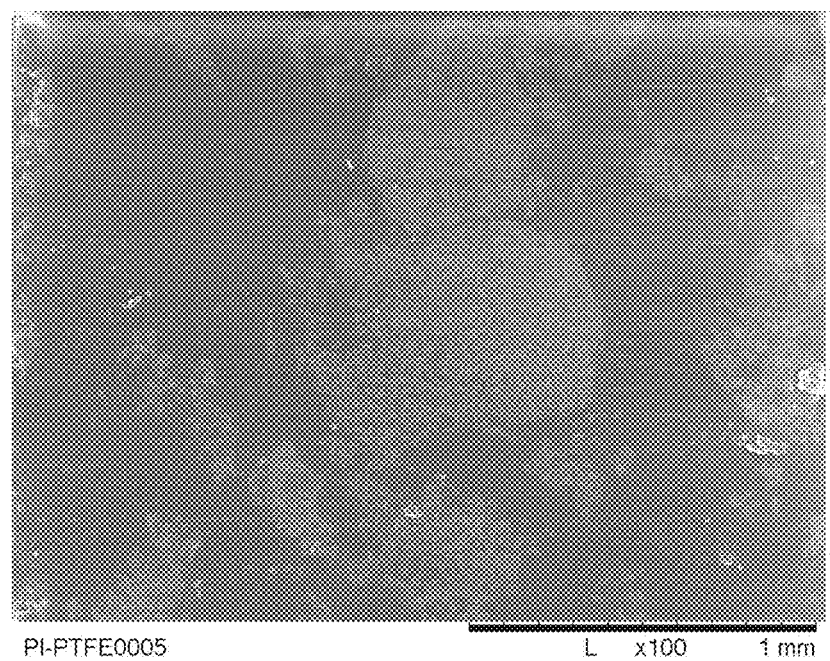
FIGS. 12 and 13 illustrate the SEM of Sample 2.
Figure 13:
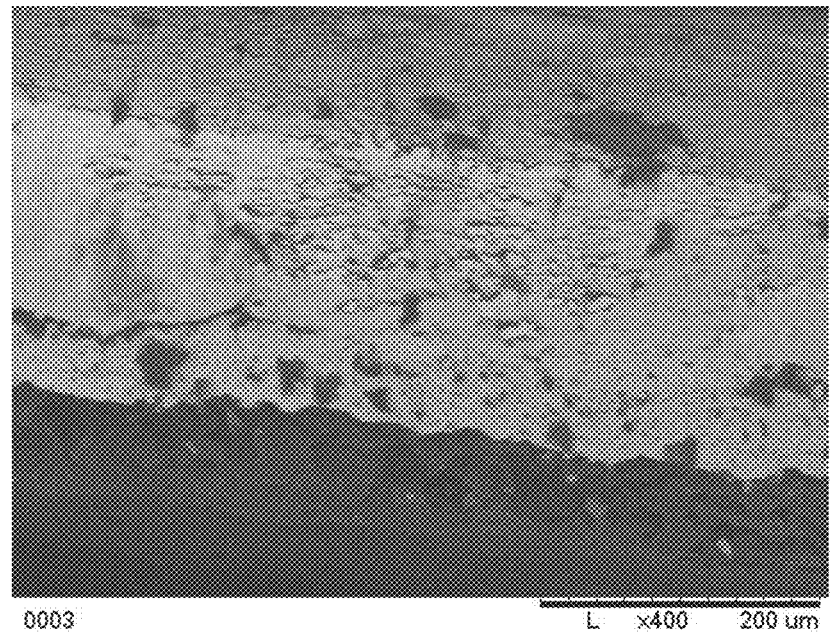
Figure 14:
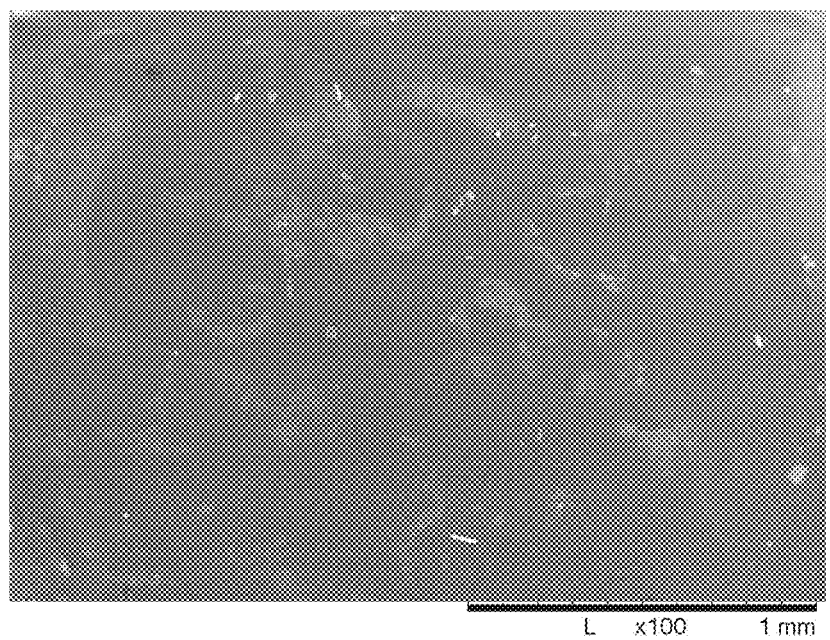
FIGS. 14 and 15 illustrate the SEM of Sample 3.
Figure 15:
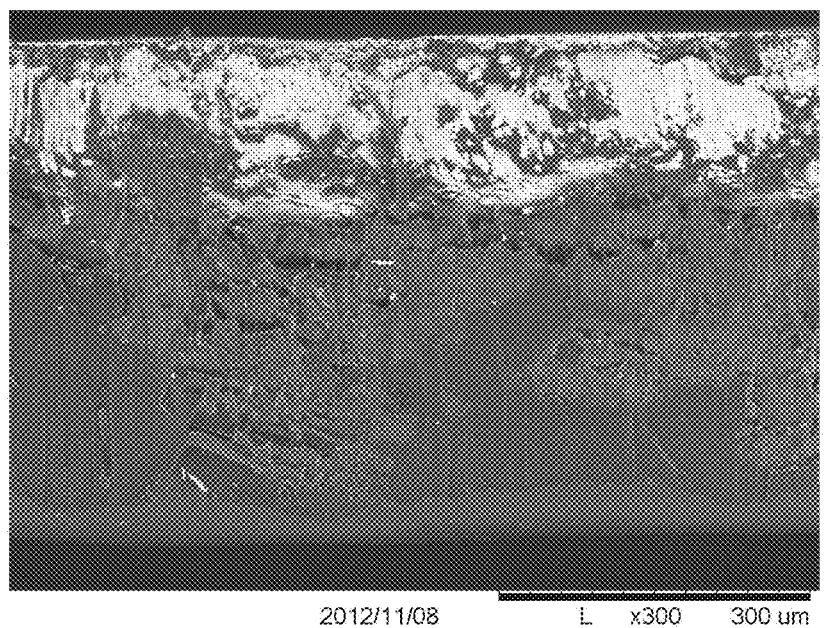

Samples 1-3 were also observed under a microscope and evaluated for its microstructure with an SEM. The results are illustrated in FIGS. 10-15, in which FIGS. 10 and 11 illustrate the SEM of Sample 1; FIGS. 12 and 13 illustrate the SEM of Sample 2; and FIGS. 14 and 15 illustrate the SEM of Sample 3. The SEM images illustrate inhomogeneous distribution of the PTFE filler in all three samples.

TABLE 1

| Sample | Wear Volume (mm³) | Coefficient of Friction | Temperature (° C.) |
|---|---|---|---|
| 1 | 1.3 | 0.17 | 46 |
| 2 | 0.3 | 0.22 | 46 |
| 3 | 0.3 | 0.21 | 46 |
| C4 | 7.8 | 0.3 | 60 |
| C5 | 4.8 | 0.17 | 48 |
| C6 | 2.9 | 0.16 | 45 |

As illustrated by the results in Table 1, samples 1-3 exhibited an unexpected and surprising significant improvement in the combination of wear volume and coefficient of friction. It has heretofore not been known how to create a bearing having the combined superior wear volume and coefficient of friction illustrated in samples 1-3.

EXAMPLE 2

Polyamic Acid Salt

Three samples were prepared and tested for coefficient of friction in dry and lubricated states and compared to the commercially available Norglide material available from Saint Gobain Performance Plastics. The three samples according to certain embodiments of the present disclosure were prepared as follows:

ODA was dissolved in the mixture of NMP and xylene. With stirring, same molar amount of PMDA was added into ODA solution at 60 degrees Celsius, and a polyamic acid solution was obtained after two hours. The same molar amount of triethylamine was added slowly into the above polyamic acid solution to form a homogenous viscous polyamic acid salt solution. Certain amount of PTFE suspension were mixed with the above polyamic acid salt solution, and used to form a substrate.

The coefficient of friction (COF) test was performed on a Plint tester, also known as a ball-on-flat sliding test. The test was performed under two different conditions: lubricated and dry. For the lubricated test, the sample is in an oil bath at room temperature during the entire test. For the dry test, the ball is directly in contact with the samples without any kind of lubrication beyond that provided by the coating itself. The three samples according to the embodiments of the disclosure were differentiated as follows:

25% PTFE and a coating thickness of about 50 microns, prepared with the following composition:

|  | Mass (g) | % solids |
|---|---|---|
| DI water | 2.3 | 100 |
| PAA salt | 2.0 | 17 |
| PTFE | 0.27 | 50 |

35% PTFE and a coating thickness of about 90 microns, prepared with the following composition:

|  | Mass (g) | % solids |
|---|---|---|
| DI water | 2.3 | 100 |
| PAA salt | 2.0 | 17 |
| PTFE | 0.43 | 50 |

45% PTFE and a coating thickness of about 130 microns prepared with the following composition:

|  | Mass (g) | % solids |
|---|---|---|
| DI water | 2.3 | 100 |
| PAA salt (12 um particles) | 2.0 | 17 |
| PTFE | 0.66 | 50 |

The oscillation frequency of the ball was 0.11 Hz, the distance travelled during a period was 3 cm (round trip), the charge was 25 N and test duration was 5 minutes. The pressure applied to the coating during the test should be 53 MPa to be at the same conditions listed for Test 1. The area of contact between the coating and the ball was about $5 \cdot 10^{-5}$ m$^2$, so the pressure (with a 25 N load) was close to 50 MPa.

In the lubricated test, all of the PTFE/PI samples had approximately the same COF as illustrated in Table 8 below. They are all lower than the COF of Norglide.

TABLE 8

Results of the Plint test for lubricated conditions

| | Coating composition (in solids %) | | | |
|---|---|---|---|---|
| | Norglide | 25% PTFE | 35% PTFE | 45% PTFE |
| COF lubricated (+/-10%) | 0.022 | 0.017 | 0.018 | 0.018 |

In the dry test, the COF values show more differences and decrease with an increase in the weight percent PTFE in the coating (Table 9). Again, all of the PTFE/PI samples are better than the Norglide material.

TABLE 9

Results of the Plint test for dry conditions

| | Coating composition (in solids %) | | | |
|---|---|---|---|---|
| | Norglide | 25% PTFE | 35% PTFE | 45% PTFE |
| COF dry (+/-10%) | 0.028 | 0.023 | 0.018 | 0.016 |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

EXAMPLE 3

Lamination

Samples according to certain embodiments of the present disclosure were prepared by coating the 25% PTFE mixture described in Example 2 onto a corona treated Kapton® release film and cured. The coating had a thickness of about 70 to 130 um. The composite was then laminated onto a zinc plated steel substrate instead of directly coating onto the steel substrate as done in Example 2. In one example, a layer of modified ETFE film was used between the steel substrate and the cured composite with the cured coating layer in direct contact with the modified ETFE film. In another example, a layer of epoxy was used between the steel substrate and the cured composite. The bearing samples were then hot pressed to cure the modified ETFE layer or epoxy layer. The COF was then measured in the dry conditions as described above in the Plint test, with the following parameters:

The oscillation frequency of the ball was 5 Hz, the distance travelled during a period was 3 cm (round trip), the charge was 82 N and test duration was 18 minutes. The pressure applied to the coating during the test should be 53 MPa to be at the same conditions listed for Test 1. The area of contact between the coating and the ball was about $5.10^{-5}$ m$^2$, so the pressure (with a 82 N load) was close to 53 MPa.

Figure 16:
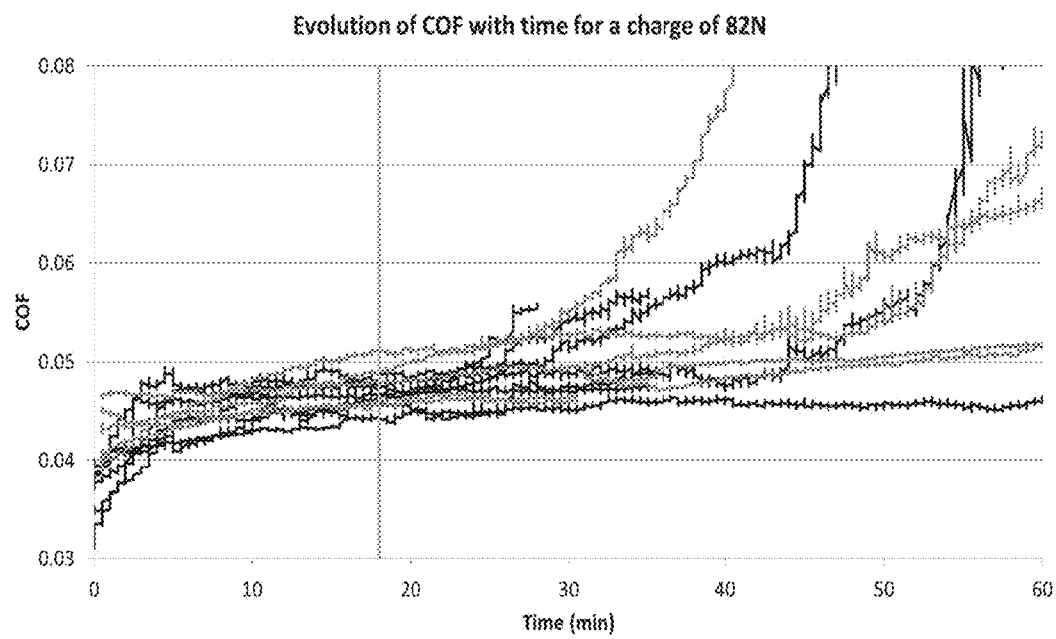
FIG. 16 illustrates the dry coefficient of friction data for example 3.

The results of the dry test of the two samples described above are reported in FIG. 16. As shown, similarly excellent COF values were obtained for both samples.

Figure 17:
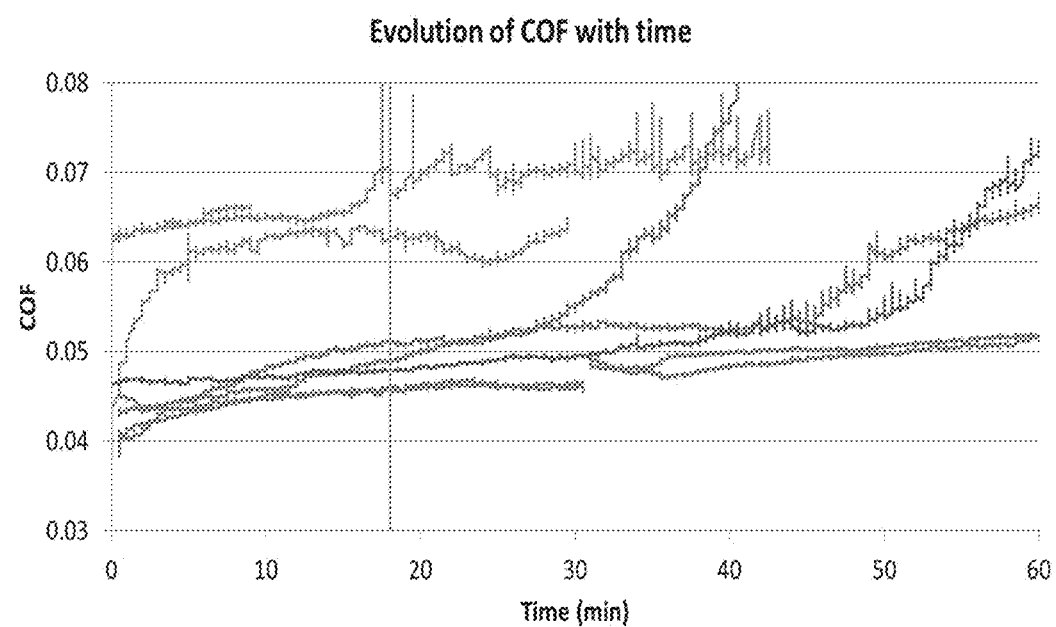
FIG. 17 illustrates the lubricated coefficient of friction data for example 3.

The sample containing modified ETFE was then tested against commercially available norglide material and a JBT sample obtained from Saint-Gobain Pampus, Germany under the tradename Norglide T. The results are reported in FIG. 17. As shown, the sample according to certain embodiments of the present disclosure significantly outperformed the Norglide sample and essentially matched the JBT sample.

Example 3 above illustrates, at least, that samples can be prepared by coating onto a release film and cured and then laminated onto a substrate without suffering from shrinkage due to differences in the thermal expansion between the steel substrate and the coating. Accordingly, a superior and longer lasting bearing can be obtained.

Item 1. A bearing comprising:
a. a substrate; and
b. a layer disposed on the substrate, wherein the layer comprises
    i. a polyimide matrix; and
    ii. a filler dispersed within the polyimide matrix, wherein the filler comprises a thermoplastic or an organic filler.

Item 2. A bearing comprising:
a. a substrate; and
b. a layer disposed on the substrate, wherein the layer comprises:
    i. a polyimide matrix derived from a polyamic acid salt; and
    ii. a thermoplastic and/or organic filler dispersed within the polyimide matrix.

Item 3. A bearing comprising:
a. a substrate; and
b. a first layer disposed on the substrate, wherein the first layer comprises a polyimide matrix and a filler dispersed within the polyimide matrix;
c. wherein the bearing has a coefficient of friction of less than about 1, and a wear resistance of less than about 2.9 $mm^3$.

Item 4. A bearing having a coefficient of friction of less than about 1, and a wear resistance of less than 2.9 $mm^3$.

Item 5. The bearing of any one of items 1-3, wherein the substrate comprises a metal.

Item 6. The bearing of item 4, wherein the metal comprises steel, aluminum, bronze, or copper.

Item 7. The bearing of any one of items 1-3, wherein the bearing has an average coefficient of friction (COF) of no greater than about 1, no greater than about 0.8, no greater than about 0.7, no greater than about 0.6, no greater than about 0.5, no greater than about 0.4, no greater than about 0.3, no greater than about 0.25, no greater than about 0.2, no greater than about 0.18, no greater than about 0.15, or even no greater than about 0.12 as measured according to ASTM G-77.

Item 8. The bearing of any one of items 1-3, wherein the bearing has an average coefficient of friction (COF) of no less than about 0.001, no less than about 0.01, or even no less than about 0.05 as measured according to ASTM G-77.

Item 9. The bearing of any one of items 1-3, wherein the bearing has a wear resistance of no greater than about 10 $mm^3$, no greater than about 8 $mm^3$, no greater than about 5 $mm^3$, no greater than about 4 $mm^3$, no greater than about 3 $mm^3$, no greater than about 2.9 $mm^3$, no greater than about 2 $mm^3$, no greater than about 1.5 $mm^3$, no greater than about 1.3 $mm^3$, no greater than about 1.1 $mm^3$, no greater than about 1 $mm^3$, no greater than about 0.8 $mm^3$, no greater than about 0.6 $mm^3$, no greater than about 0.5 $mm^3$, no greater than about 0.3 $mm^3$, or even no greater than about 0.2 $mm^3$ as measured according to ASTM G-77.

Item 10. The bearing of any one of items 1-3, wherein the bearing has a wear resistance of no less than about 0.001 $mm^3$, no less than about 0.01 $mm^3$, or even no less than about 0.05 $mm^3$ as measured according to ASTM G-77.

Item 11. The bearing of any one of items 1-3, wherein the layer disposed on the substrate passes the Laminator Adhesion Test (Erichsen).

Item 12. The bearing of any one of items 1-3, wherein the layer disposed on the substrate has a thickness of no greater than about 1 mm, no greater than about 800 microns, no greater than about 500 microns, no greater than about 300 microns, no greater than about 250 microns, no greater than about 200 microns, or even no greater than about 175 microns.

Item 13. The bearing of any one of items 1-3, wherein the layer disposed on the substrate has a thickness of at least about 0.01 microns, at least about 1 micron, at least about 50 microns, or even at least about 100 microns.

Item 14. The bearing of any one of items 1-3, wherein the layer disposed on the substrate has a porosity of at least about 0.01%, at least about 0.05%, or even at least about 0.1%.

Item 15. The bearing of any one of items 1-3, wherein the polyimide matrix comprises a crosslinked and imidized polyamic acid.

Item 16. The bearing of item 14, wherein the polyamic acid or polyamic acid salt comprises a reaction product of two different monomers selected from the group consisting of: pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and 4, 4'-oxydianiline (ODA), or m-phenylene diamine (m-PDA), 4, 4'-diaminophenyl sulphone (4,4'-DDS), p-phenylene diamine (p-PDA), and methylene dianiline (MDA).

Item 17. The bearing of item 14, wherein the polyamic acid or polyamic acid salt comprises a reaction product of a first monomer and a second monomer, wherein the first and second monomers are different.

Item 18. The bearing of item 16, wherein the first monomer comprises a monomer selected from the group consisting of pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and any combination thereof; and wherein the second monomer comprises a monomer selected from the group consisting of 4, 4'-oxydianiline (ODA), or m-phenylene diamine (m-PDA), 4, 4'-diaminophenyl sulphone (4,4'-DDS), p-phenylene diamine (p-PDA), methylene dianiline (MDA), and any combination thereof.

Item 19. The bearing of any one of the preceding items, wherein the polyimide matrix is derived from a polyamic acid salt.

Item 20. The bearing of any one of the preceding items, wherein the polyimide matrix comprises an imidized reaction product of a polyamic acid salt.

Item 21. The bearing of any one of items 1-3, wherein the thermoplastic comprises a fluoropolymer.

Item 22. The bearing of item 18, wherein the thermoplastic comprises a perfluoroplymer.

Item 23. The bearing of item 18, wherein the thermoplastic comprises PTFE.

Item 24. The bearing of item 20, wherein the thermoplastic comprises PTFE regrind.

Item 25. The bearing of any one of items 1-3, wherein the thermoplastic is present in the layer in an amount of from greater than 0 to 80% by weight, based on the combined weight of the thermoplastic and the polyimide matrix.

Item 26. The bearing of any one of items 1-3, wherein the polyimide matrix is present in the layer in an amount of from 20 to 100% by weight, based on the combined weight of the thermoplastic and the polyimide matrix.

Item 27. The bearing of any one of items 1-3, wherein the layer disposed on the substrate further comprises an organic filler.

Item 28. The bearing of item 24, wherein the organic filler is present in the layer in an amount of from greater than 0% to 80% by weight, based on the combined weight of the thermoplastic, polyimide matrix, and organic filler.

Item 29. The bearing of any one of items 1-3, wherein the bearing further comprises an intermediate layer disposed between the substrate and the layer.

Item 30. The bearing of item 26, wherein the intermediate layer comprises zinc or a zinc containing compound.

Item 31. A method of forming a composite bearing comprising:
a. providing a polyimide precursor or imide monomers;
b. providing a thermoplastic;
c. blending the thermoplastic, the polyimide precursor or imide monomers, and a solvent to form a mixture;
d. depositing the mixture on a substrate;
e. thermally curing the substrate and deposited mixture to thereby imidize the polyimide precursor and form a composite sheet.

Item 32. A method of forming a composite bearing, the method comprising:
a. providing a polyimide precursor or imide monomers;
b. providing an organic filler;
c. blending the filler, the polyimide precursor or imide monomers, and a solvent to form a mixture;
d. depositing the mixture on a substrate;
e. thermally curing the substrate and deposited mixture to thereby imidize the polyimide precursor and form a composite sheet.
f. forming a bearing from the composite sheet.

Item 33. A method of forming a composite bearing, the method comprising:
a. providing a polyimide precursor or imide monomers;
b. providing an organic filler and/or a thermoplastic;
c. blending the organic filler and/or thermoplastic, the polyimide precursor or imide monomers, and a solvent to form a mixture;
d. depositing the mixture on a substrate;
e. thermally curing the substrate and deposited mixture to thereby imidize the polyimide precursor and form a composite sheet; and
f. forming a bearing from the composite sheet;
g. wherein the bearing has a coefficient of friction of less than about 1, and a wear resistance of less than 2.9 mm$^3$ Item 34. The method of any one of items 28-30, wherein thermally curing comprises a stepwise thermal curing.

Item 35. The method of item 31, wherein the stepwise thermal curing includes a plurality of steps, wherein each step lasts between about 10 minutes and 6 hours, and wherein each step has a temperature increase between successive steps of between about 10 degrees Celsius and 50 degrees Celsius.

Item 36. The method of any one of items 28-30, wherein the solvent comprises N-methyl-pyrrolidone (NMP), dimethylformamide, dimethylacetamide, diglyme, dimethylsulfoxide, xylene, or any combination thereof.

Item 37. The method of any one of items 28-30, wherein the polyimide precursor comprises polyamic acid.

Item 38. The method of any one of the preceding items, wherein the polyimide precursor comprises polyamic acid salt.

Item 39. The method of item 34, wherein the polyamic acid or polyamic acid salt is derived from at least two different monomers selected from the group consisting of: pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and 4, 4'-oxydianiline (ODA), or m-phenylene diamine (m-PDA), 4, 4'-diaminophenyl sulphone (4,4'-DDS), p-phenylene diamine (p-PDA), and methylene dianiline (MDA).

Item 40. The method of item 34, wherein the polyamic acid or polyamic acid salt is derived from a first monomer and a second monomer, and wherein the first and second monomer are different.

Item 41. The method of item 36, wherein the first monomer comprises a monomer selected from the group consisting of pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl]propane dianhydride (BPADA), benzophenonetetracarboxylic dianhydride (BTDA), and any combination thereof; and wherein the second monomer comprises a monomer selected from the group consisting of 4, 4'-oxydianiline (ODA), or m-phenylene diamine (m-PDA), 4, 4'-diaminophenyl sulphone (4,4'-DDS), p-phenylene diamine (p-PDA), methylene dianiline (MDA), and any combination thereof.

Item 42. The method of any one of items 28-30, wherein the thermoplastic comprises a fluoropolymer.

Item 43. The method of any one of items 28-30, wherein the thermoplastic comprises a perfluoroplymer.

Item 44. The method of any one of items 28-30, wherein the thermoplastic comprises PTFE.

Item 45. The method of any one of items 28-30, wherein the thermoplastic comprises PTFE regrind.

Item 46. The method of any one of items 28-30, wherein the thermoplastic has an average particle size ($D_{50}$) of at least 1 about 1 micron, at least about 3 microns, at least about 5 microns, at least about 10 microns, at least about 15 microns, or even at least about 20 microns.

Item 47. The method of any one of items 28-30, wherein the thermoplastic has an average particle size ($D_{50}$) of no greater than about 50 microns, no greater than about 30 microns, no greater than about 20 microns, or even no greater than about 10 microns.

Item 48. The method of any one of items 28-30, wherein the thermoplastic has an average particle size ($D_{50}$) with a range of between about 1 micron and 50 microns, about 3 microns to about 30 microns, or even about 5 microns to about 20 microns.

Item 49. The method of any one of items 28-30, wherein the thermoplastic is in a powdered form.

Item 50. The method of any one of items 28-30, wherein the thermoplastic is in a dispersed phase.

Item 51. The method of any one of items 28-30, wherein the thermoplastic has an average particle size of at least 0.05 microns, at least about 0.1 micron, or even at least about 2 microns.

Item 52. The method of any one of items 28-30, wherein the thermoplastic has an average particle size of no greater than about 1000 microns, no greater than about 500 microns, or even no greater than about 100 microns.

Item 53. The method of any one of items 28-30, wherein the viscosity of the mixture is adjusted to form a predetermined thickness of the mixture deposited on the substrate.

Item 54. The method of any one of items 28-30, wherein the thermoplastic is present in the mixture in an amount of from greater than 0 to 80% by weight, based on the combined weight of the thermoplastic and the polyimide precursor.

Item 55. The method of any one of items 28-30, wherein the polyimide precursor is present in the mixture in an amount of from 20 to 100% by weight, based on the combined weight of the thermoplastic and the polyimide precursor.

Item 56. The method of any one of items 28-30, further comprising providing an organic filler, and mixing the organic filler with the thermoplastic.

Item 57. The method of item 52, wherein the organic filler is present in the mixture in an amount of from greater than 0% to 80% by weight, based on the combined weight of the thermoplastic, polyimide precursor, and organic filler.

Item 58. The method of any one of items 28-30, wherein the substrate comprises a metal.

Item 59. The method of item 54, wherein the metal comprises steel, aluminum, bronze, copper, or combinations thereof.

Item 60. The method of any one of items 28-30, further comprising treating the substrate to improve adhesion between the deposited mixture and the substrate prior to deposition of the mixture on the substrate.

Item 61. The method of item 56, wherein treating comprises chemically treating a surface of the substrate adjacent the layer prior to deposition of the mixture on the substrate.

Item 62. The method of item 57, wherein chemically treating comprises coating the surface of the substrate with a composition comprising zinc or a zinc containing compound.

Item 63. The method of item 56, wherein treating comprises mechanically treating a surface of the substrate adjacent the layer prior to deposition of the mixture on the substrate.

Item 64. The method of item 59, wherein mechanically treating comprises sand blasting or mechanically etching the surface of the substrate.

Item 65. The method of any one of items 28-30, further comprising forming more than one layer comprising a polyimide matrix on the substrate.

Item 66. The method of any one of items 28-30, further comprising adding a second filler to the mixture.

Item 67. The method of item 62, wherein the second filler is selected from the group consisting of carbon graphite, grapheme, carbon nanotubes, ekonol, glass fibers, a polymeric compound, an inorganic compound, and combinations thereof.

Item 68. The method of any one of items 28-30, wherein thermally curing comprises controlling the temperature such that the composite has a porosity of at least about 0.1%.

Item 69. The method of any one of items 28-30, further comprising providing a catalyst and mixing the catalyst with the thermoplastic.

Item 70. The method of item 65, wherein the catalyst accelerates imidization of the polyamic acid.

Item 71. The method of item 65, wherein the catalyst comprises a strong tertiary aliphatic base.

Item 72. The method of item 65, wherein the catalyst comprises 1, 4-diazabicyclo[2.2.2]octane (DABCO); 1, 8-diazabicyclo[5.4.0]undec-7-ene (DBU); a nitrogen containing base; phenol; or an amphoteric material.

Item 73. The method of any one of items 28-30, wherein the method is a continuous process.

Item 74. The method of any one of items 28-30, further comprising at least partially cutting the coated substrate.

Item 75. The bearing or method of any one of the preceding items, wherein the filler comprises an aromatic polyester, a recycled polyimide, polyamide ether imide, polyamide imide, PEEK, PEEK-like polymers of polyaryl family, liquid crystalline polymers (LCP), polybenzimidazole, or combinations thereof.

Item 76. The bearing or method of any one of the preceding items, wherein the organic filler comprises an aromatic polyester, a recycled polyimide, polyamide ether imide, polyamide imide, PEEK, PEEK-like polymers of polyaryl family, liquid crystalline polymers (LCP), polybenzimidazole, or combinations thereof.

Item 77. The method of any one of the preceding items, wherein the substrate is a release film, and wherein the method further comprising curing the mixture on the release film, and after, forming a composite with a steel substrate.

Item 78. The method of item 77, wherein the method further comprises removing the release film after formation of the composite with a second substrate such that the cured mixture forms an outer surface of the bearing.

Item 79. The method of item 78, wherein the second substrate comprises a metallic substrate.

Item 80. The method of item 79, wherein the second substrate comprises steel.

Item 81. The method of any one of the preceding items, wherein the release film is surface treated before deposition of the mixture.

Item 82. The method of any one of the preceding items, wherein the second substrate is a zinc coated steel substrate.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A bearing comprising:
   a. a substrate; and
   b. a first layer disposed on the substrate, wherein the layer comprises
      i. a polyimide matrix; and
      ii. a filler dispersed within the polyimide matrix, wherein the filler comprises a thermoplastic and/or an organic filler, wherein the first layer disposed on the substrate has a porosity of at least about 0.01%.

2. The bearing of claim 1, wherein the substrate comprises a metal substrate.

3. The bearing of claim 1, wherein the substrate steel, aluminum, bronze, or copper.

4. The bearing of claim 1, wherein the polyimide matrix comprises a crosslinked and imidized polyamic acid or polyamic acid salt.

5. The bearing of claim 4, wherein the crosslinked and imidized polyamic acid or polyamic acid salt comprises a reaction product of two different monomers selected from the group consisting of: pyromellitic dianhydride (PMDA), 3,3'-4, 4'-biphenyltetracarboxylic dianhydride (BPDA), 2, 2-bis (3, 4-dicarboxyphenyl) hexafluoropropane dianhydride (6FDA), 2, 2'-bis [4-(3, 4-dicarboxyphenoxy)phenyl] propane dianhydride (BPADA), benzophenonetetracarboxylic dianhydride (BTDA), and 4, 4'-oxydianiline (ODA), or m-phenylene diamine (m-PDA), 4, 4'-diaminophenyl sulphone (4,4'-DDS), p-phenylene diamine (p-PDA), and methylene dianiline (MDA).

6. The bearing of claim 1, wherein the filler comprises a thermoplastic fluoropolymer.

7. The bearing of claim 1, wherein the filler comprises a thermoplastic perfluoropolymer.

8. The bearing of claim 1, wherein the filler comprises PTFE.

9. The bearing of claim 1, wherein the filler comprises an organic filler.

10. The bearing of claim 1, wherein the filler comprises a thermoplastic filler and an organic filler.

11. The bearing of claim 1, wherein the filler is present in the first layer in an amount of from greater than 0 to 80% by weight, based on the combined weight of the filler and the polyimide matrix.

12. The bearing of claim 1, wherein the bearing has a coefficient of friction of less than about 1, and a wear resistance of less than about 2.9 $mm^3$.

13. The bearing of claim 1,
   a. wherein the substrate comprises steel;
   b. wherein the polyimide matrix comprises a crosslinked and imidized polyamic acid or polyamic acid salt;
   c. wherein the filler comprises PTFE; and
   d. wherein the bearing has a coefficient of friction of less than about 1, and a wear resistance of less than about 2.9 $mm^3$.

14. A bearing comprising:
   a. a metal substrate; and
   b. a first layer, wherein the first layer comprises a polyimide matrix and a filler dispersed within the polyimide matrix;
   c. wherein the bearing has a coefficient of friction of less than about 1, and a wear resistance of less than about 2.9 $mm^3$, wherein the first layer disposed on the substrate has a porosity of at least 0.01%.

15. The bearing of claim 14, wherein the bearing further comprises an adhesive layer disposed between the metal substrate and the first layer.

16. The bearing of claim 1, wherein the first layer disposed on the substrate has a thickness of at least about 0.01 microns.

17. The bearing of claim 1, wherein the polyimide matrix comprises an imidized reaction product of a polyamic acid salt.

18. The bearing of claim 1, wherein the organic filler is present in the layer in an amount of from greater than 0% to 80% by weight, based on the combined weight of the thermoplastic, polyimide matrix, and organic filler.

19. The bearing of claim 1, wherein the bearing further comprises an intermediate layer disposed between the substrate and the layer.

* * * * *